United States Patent
Okuzawa et al.

(12) 
(10) Patent No.: US 6,474,317 B2
(45) Date of Patent: Nov. 5, 2002

(54) HEAT EXCHANGE SUPPORT PLATE FOR ENGINE CARBURETORS

(75) Inventors: Kazuhiro Okuzawa; Jun Nakata, both of Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/756,076

(22) Filed: Jan. 8, 2001

(65) Prior Publication Data
US 2001/0020468 A1 Sep. 13, 2001

(30) Foreign Application Priority Data
Jan. 7, 2000 (JP) .................................. 2000-005896

(51) Int. Cl.$^7$ ............................................ F02M 31/00
(52) U.S. Cl. ..................................................... 123/543
(58) Field of Search ................................ 123/543–557, 123/41.31, 585

(56) References Cited

U.S. PATENT DOCUMENTS

| | | | | |
|---|---|---|---|---|
| 4,029,065 A | * | 6/1977 | Wood | 123/543 |
| 4,084,564 A | * | 4/1978 | Rickert | 123/41.31 |
| 4,089,314 A | * | 5/1978 | Bernecker | 123/557 |
| 4,329,969 A | * | 5/1982 | Kawai | 123/585 |
| 4,691,671 A | | 9/1987 | Nishimura | |
| 4,848,294 A | | 7/1989 | Yamamoto | |
| 5,140,966 A | * | 8/1992 | Wong | 123/543 |
| 5,275,146 A | * | 1/1994 | Yamashita | 123/549 |

\* cited by examiner

*Primary Examiner*—M. McMahon
(74) *Attorney, Agent, or Firm*—Knobbe, Martens Olson & Bear, LLP (57) ABSTRACT

An internal combustion engine includes at least one combustion chamber formed by at least a first member and a second member that moves relative to the first member. The second member is coupled to an output shaft such that movement of the second member causes the output shaft to rotate. The engine also includes a cooling system configured to circulate coolant into thermal communication with at least a portion of the engine. An induction system is also included for providing a fuel/air charge to the combustion chamber. The induction system includes a charge former configured to form the fuel/air charge and a mounting plate that is attached to the carburetor. The mounting plate includes a first coolant passage that is in communication with the cooling system.

40 Claims, 6 Drawing Sheets

HEAT EXCHANGE SUPPORT PLATE FOR ENGINE CARBURETORS

PRIORITY INFORMATION

This application is based on and claims priority to Japanese Patent Application Patent No. 2000 005896 filed Jan. 7, 2000, the entire contents of which are hereby expressly incorporated by reference.

BACKGROUND OF THE INVENTION

1. Field of the Invention

This invention relates to a carburetor for an outboard motor, and more particularly to an improved arrangement for heating a carburetor of an outboard motor.

2. Related Art

Outboard motors are used to power boats and other watercraft. Outboard motors typically include an internal combustion engine that is surrounded by a protective cowling. The engine can include a carburetor, which vaporizes liquid fuel and mixes it with air for delivering a fuel/air charge to the combustion chambers of the engine. The vaporization of the liquid fuel tends to cool the intake charge. If the outboard motor is being operated in a cold environment, this cooling can cause icing in the carburetor. To avoid this situation, various devices have been incorporated into engines to heat the carburetor particularly during cold starting and cold warm-up. These devices include water heating jackets that are formed inside the carburetors and electrical heaters that are provided in the carburetors. These arrangements, however, tend to be complicated and thus add to the cost of the outboard motor. Moreover, in outboard motors space, is limited and these devices tend to undesirably increase the size of the outboard motor.

SUMMARY OF THE INVENTION

Accordingly, there is a need for an improved arrangement for heating a carburetor of an outboard motor that is smaller and less complicated than prior art arrangements for heating the carburetor of an outboard motor.

One aspect of the present invention involves an internal combustion engine includes at least one combustion chamber formed by at least a first member and a second member that moves relative to the first member. The second member is coupled to an output shaft such that movement of the second member causes the output shaft to rotate. The engine also includes a cooling system configured to circulate coolant into thermal communication with at least a portion of the engine. An induction system is also included for providing a fuel/air charge to the combustion chamber. The induction system includes a charge former configured to form the fuel/air charge and a mounting plate that is attached to the carburetor. The mounting plate includes a first coolant passage that is in communication with the cooling system.

Another aspect of the present invention involves an internal combustion engine comprising at least one combustion chamber formed by at least a first member and a second member that moves relative to the first member. The second member is coupled to an output shaft such that movement of the second member causes the output shaft to rotate. The engine also includes a cooling system configured to circulate coolant into thermal communication with at least a portion of the engine. An induction system is also provided for providing a fuel/air charge to the combustion chamber. The induction system includes that a charge former configured to form the fuel/air charge and means for warming the charge former with coolant from the cooling system.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
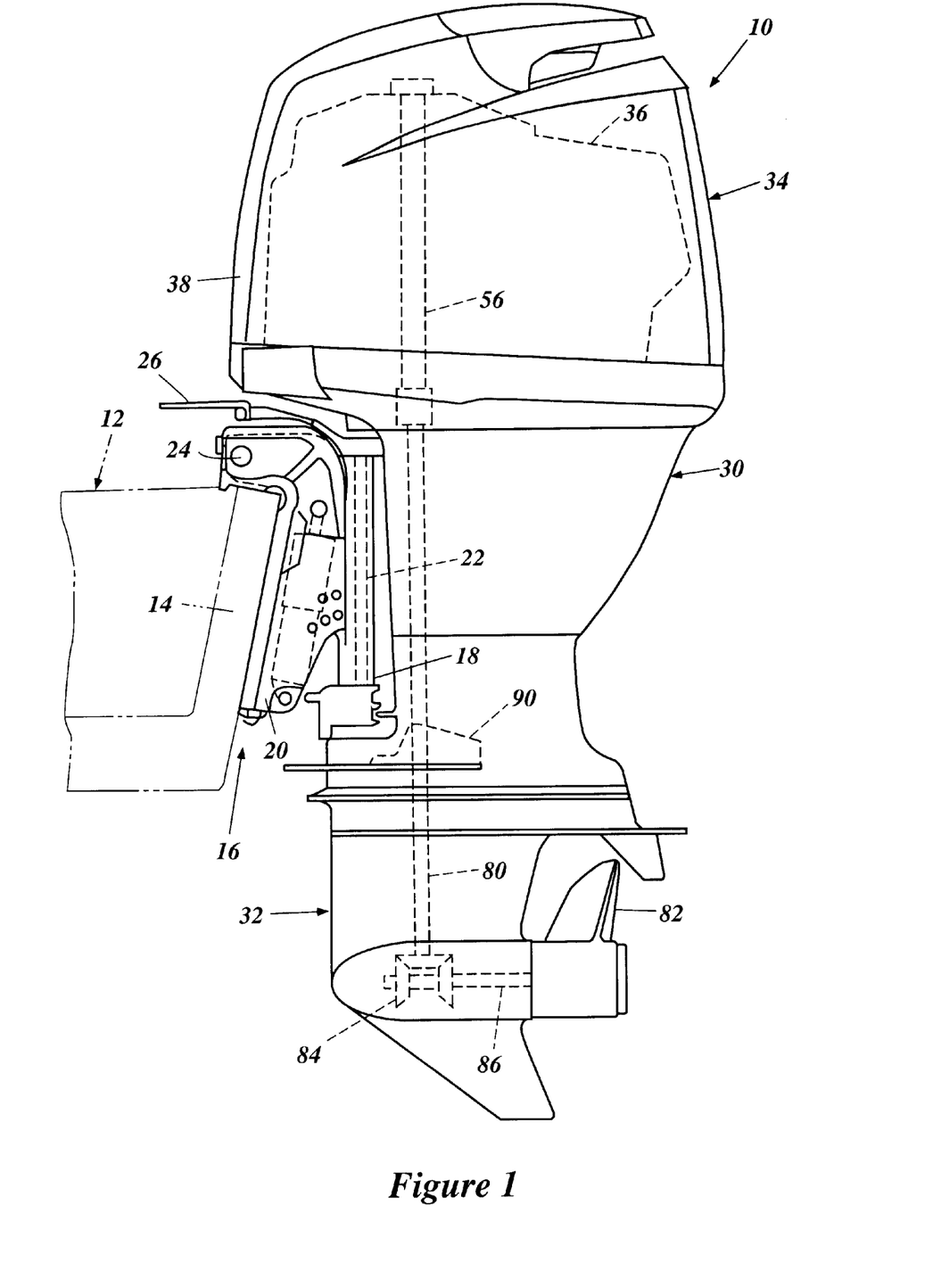
FIG. 1 is a side elevational view of an outboard motor including an internal combustion engine having certain features and advantages according to the present invention.
Figure 2:
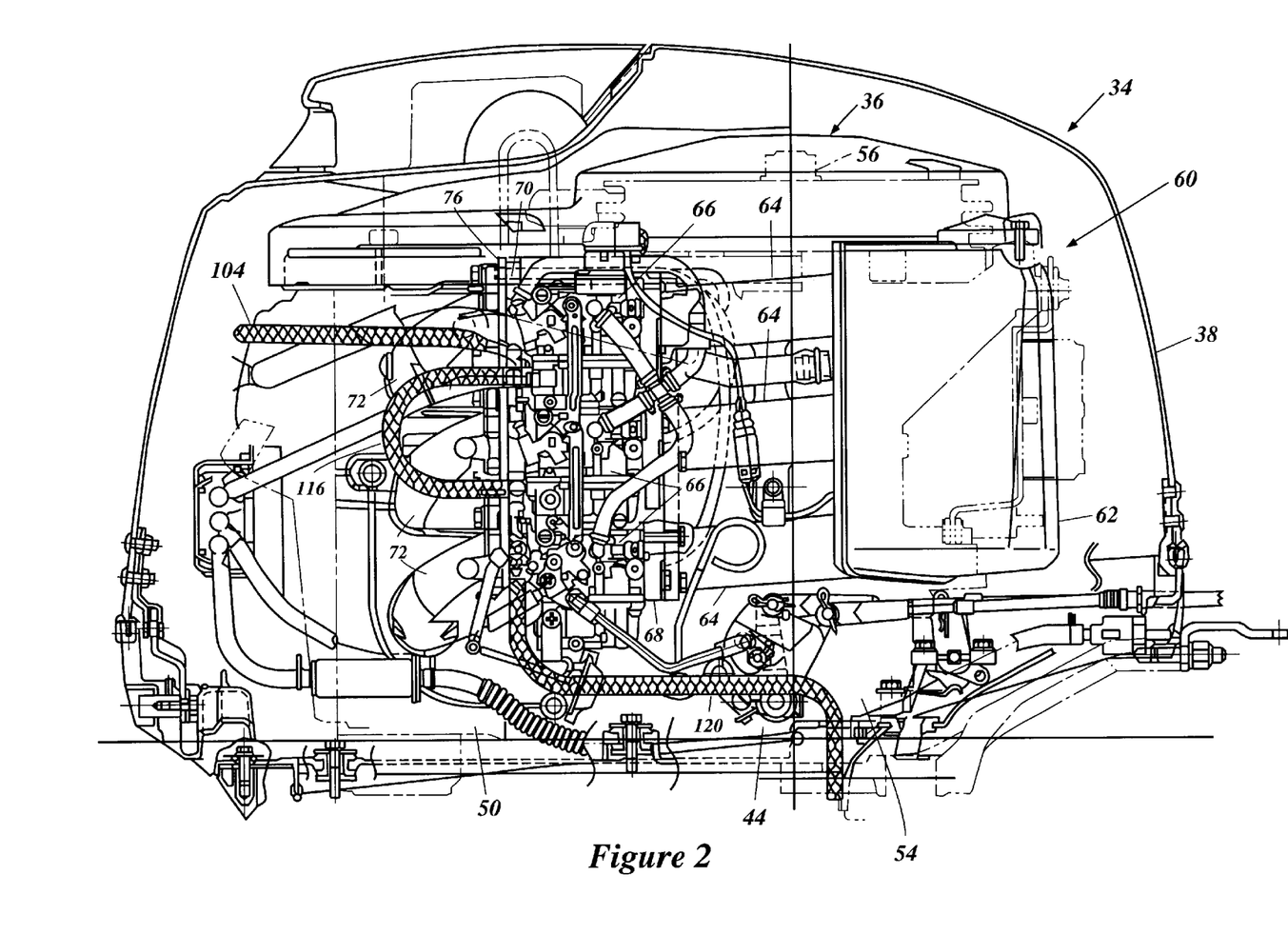
FIG. 2 is a side elevational view of a power head of the outboard motor of FIG. 1.
Figure 3:
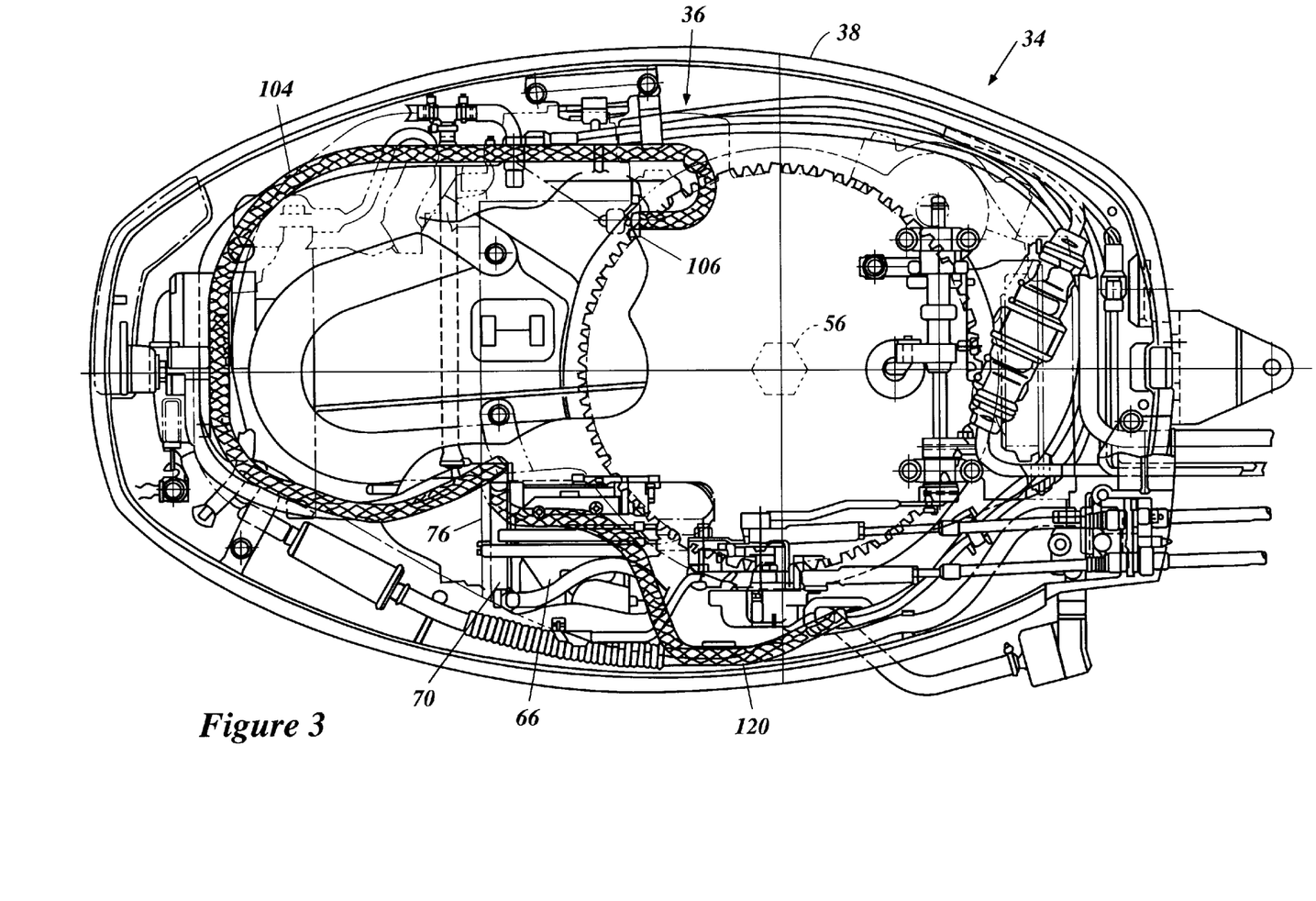
FIG. 3 is a top wire frame view of the power head of FIG. 2.

FIGS. 1–3 illustrate an outboard motor 10 for powering a watercraft 12. While the present invention will be described in the context of an outboard motor, it should be apparent to those of ordinary skill in the art that the present invention can be used in other environments. For instance, the present invention may find utility in personal watercraft, small water vehicles, jet boats and offroad vehicles. In particular, due to the unique operating characteristics of water vehicles, the present invention is particularly designed for use in such applications.

With initial reference to FIG. 1, the illustrated outboard motor 10 is attached to a transom 14 of the watercraft 12 through the use of a bracket assembly 16. Any suitable bracket assembly 16 can be used to attach the outboard motor 10 to the watercraft 12. The bracket assembly 16 preferably allows the outboard motor 10 to be tilted and trimmed about a generally horizontal axis and preferably allows the outboard motor 10 to be steered about a generally vertical axis. Such arrangements are well known to those of ordinary skill in the art.

In the illustrated arrangement, the bracket assembly 16 comprises a swivel bracket 18, a clamping bracket 20, a steering shaft 22 and a pivot pin 24. The steering shaft 22 extends through the swivel bracket 18 and is affixed to the outboard motor 10 with an upper mount assembly and a lower mount assembly (not shown). The steering shaft 22 is pivotally journaled for steering movement about a generally vertically extending steering axis within the swivel bracket 18. A steering handle 26 extends upwardly and forwardly from the steering shaft 22.

The clamping bracket 18 includes a pair of bracket arms spaced apart from each other and affixed to the transom 14 of the associated watercraft 12. The pivot pin 24 completes a hinge coupling between the swivel bracket 18 and the clamping bracket 20. The pivot pin 24 extends through the bracket arms so that the clamping bracket 20 supports the swivel bracket 18 for pivotal movement about a generally horizontally extending tilt axis of the pivot pin 24.

Although not shown, a hydraulic tilt and trim adjustment system preferably is provided between the swivel bracket 18 and the clamping bracket 20 to tilt up and down and also for the trim adjustment of the outboard motor 10. As used throughout this description, the terms "forward," "front" and "fore" mean at or to the side of the bracket assembly 16. Correspondingly, the terms "rear," "reverse" and "rearwardly" mean at or to the opposite side of the front side, unless indicated otherwise.

With continued reference to FIG. 1, the outboard motor 10 in the illustrated arrangement generally comprises a drive shaft housing 30 and a lower unit 32. A power head 34 is positioned above and is supported by the drive shaft housing 30. The power head 34 generally comprises a protective cowling 38 that encases an engine 36 and provides a protective environment in which the engine 36 can operate.

The illustrated engine 36 is of the four-cycle, three cylinder, in-line type. However, it should be noted that the present invention may find utility with other types of engines (e.g., v-type, W-type, opposed) with different numbers of cylinders and/or engines that operate under other principles of operation (e.g., two-cycle, rotary, or diesel principles).

With particular reference to FIG. 2, the illustrated engine 36 preferably comprises a cylinder block 44 in which three cylinder bores are defined. It is anticipated that the cylinder block 44 can be replaced by individual cylinder bodies that define cylinder bores. In addition, the cylinder bores may receive a sleeve or other suitable treatment to reduce friction between the cylinder block 44 and a piston, which is arranged for reciprocation within the cylinder bore.

A cylinder head assembly 50 preferably is positioned rearwardly from the cylinder block 44. The cylinder head assembly 50, in combination with the pistons and the cylinder bores, defines three combustion chambers. The other end of the cylinder block 44 is closed with a crankcase member 54, which defines a crankcase chamber.

A crankshaft 56 extends generally vertically through the crankcase chamber. The crankshaft 56 is connected to the pistons by connecting rods (not shown). Accordingly, the crankshaft 56 rotates with the reciprocal movement of the pistons within the cylinder bores. In the illustrated engine 36, the crankcase member 54 is located at the forward most position of the power head 34, and the cylinder block 44 and the cylinder head assembly 50 extend rearwardly from the crankcase member 54.

The engine 36 includes an air induction system 60, which supplies an air charge to the combustion chambers. The illustrated induction system 60 includes intake passages (not shown), which are defined through a portion of the cylinder head assembly 50. The intake passages preferably include intake ports that are disposed in the cylinder head 50 and communicate with the combustion chamber. Intake control valves (not shown) can be designed to control the flow of intake air through the intake ports into the combustion chamber. The movement and control of the intake valves are well known in the art and thus is not described.

With particular reference to FIG. 2, the cowling 38 generally completely encloses the engine 36. Air is drawn into the induction system 60 from the interior of the cowling 38 through an air intake box 62. The air intake box 62 preferably has an inlet opening (not shown) at its front side that opens to the interior of the cowling 38. In the illustrated arrangement, the air drawn into the air intake box 62 is passed to a set of three intake pipes 64. The intake pipes 64 extend between the air box 62 and an associated charger former 66 for each individual combustion chamber. The charger former 66 is suitably configured to mix fuel with air to form a suitable fuel/air charge for the engine 36. In the illustrated arrangement, a first mounting plate 68 preferably connects the intake pipes 64 to the inlets of the charge former 66. The first mounting plate 68 is preferably made of metal.

In the illustrated arrangement, the charger former 66 is a carburetor, which preferably includes a float bowl (not shown) in which a constant head of fuel is provided by means of a float operated needle valve. Fuel is discharged from the float bowl through a main discharge nozzle (not shown) into a venturi throat of each of the carburetors 66. In each carburetor 66, a throttle valve preferably is positioned downstream of the nozzle for controlling the air and fuel flow from the carburetor 66. The carburetors 66 also can include idle and low speed circuits of any known type. Fuel is supplied to the carburetors 66 through a suitable fuel supply system as is well known in the art. It should be appreciated that, although in the illustrated arrangement the charger former 66 is a carburetor, certain features and advantages of the present invention can be achieved in a charger former that utilizes fuel injection.

Figure 4:
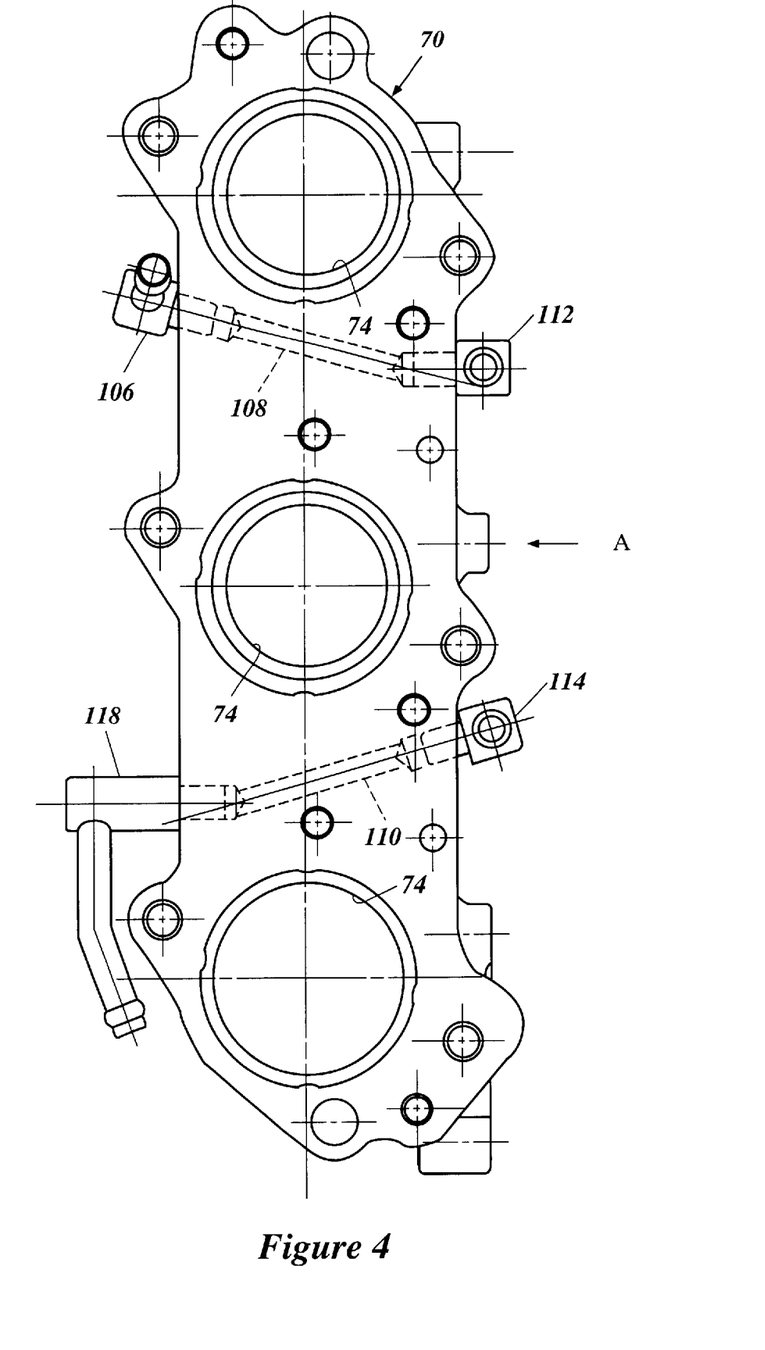
FIG. 4 is a front view of a mounting plate for a carburetor of the internal combustion engine.
Figure 5:
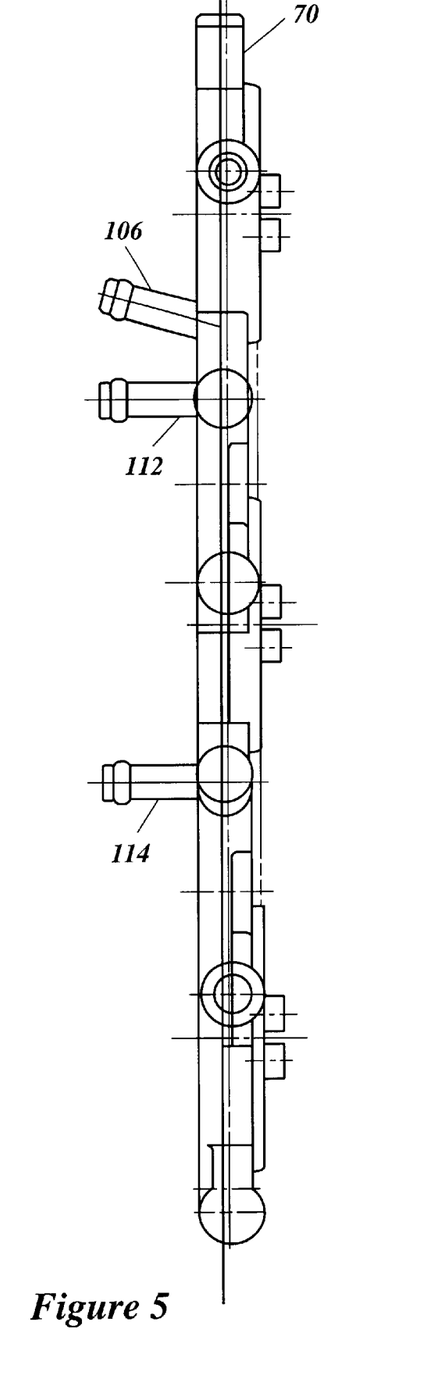
FIG. 5 is a side view taken of the mounting plate taken in the direction of arrow A of FIG. 4.

The outlets of each carburetor 66 preferably are connected to a second mounting plate 70, which is preferably made of metal and will be described in more detail below. The second mounting plate 70, in turn, is connected to an intake manifold 72, which is suitably connected to the intake passages of the cylinder head 50 such that a fuel/air charge can be delivered to the combustion chambers. Accordingly, as best seen in FIG. 4, the illustrated second mounting plate 70 preferably includes three intake holes 74 that connect the outlet of each carburetor to a corresponding branch of the intake manifold 72. In the illustrated arrangement, an insulating plate 76 preferably is situated between the intake manifold 72 and the second mounting plate 70 (see FIGS. 2 and 3). Preferably, the insulating plate 72 is made of a resin based material.

The engine 36 also includes a suitable exhaust system that is configured to discharge burnt charges or exhaust gasses outside of the outboard motor 10 from the combustion chambers. Preferably, the exhaust gases can be discharged from the combustion chamber through exhaust passages that are formed in the cylinder head assembly 50. Exhaust valves, which are controlled in any known manner, preferably control the opening and closing of the exhaust ports.

The exhaust system preferably comprises an exhaust conduit or manifold that is in communication with the exhaust passages and is partly formed by an exhaust guide, which is located under the engine 36 and partly formed in the drive shaft housing 30. The exhaust conduit communicates with an exhaust expansion chamber, which is located below the exhaust guide in the drive shaft housing 30. Accordingly, the exhaust gases can flow through the exhaust passages, the exhaust conduit and then the exhaust expansion chamber. From the expansion chamber, a passage preferably leads the exhaust gases from the expansion chamber through the drive shaft housing into the lower unit 32 such that the exhaust gases can be discharged into the body of water in which the watercraft operates in any suitable manner.

The fuel/charge drawn into the combustion chamber can be ignited through the use of any suitable ignition system.

For example, spark plugs can be provided with their electrode positioned within the combustion chamber. Such spark plugs can be fired in accordance with any suitable ignition strategy.

With reference to FIG. 1, rotational power from the crankshaft 56 preferably is provided to a driveshaft 80, which is supported in the driveshaft housing 30. The drive shaft 80 is used to power an output device such as a propeller 82. In the illustrated arrangement, a forward-neutral-reverse bevel gear transmission 84 is interposed between the driveshaft 80 and a propeller shaft 86. The propeller shaft 86 is splined or otherwise suitably connected to the propeller 82. Movement of the propeller 82 also can be controlled by the transmission 84 in any other suitable manner. For example, a shift rod can be provided to shift the transmission 84 between forward, neutral and reverse.

Several engine components also can be driven by the driveshaft 80. For example, a lubricant pump (not shown) can be provided as part of a lubrication system. Such a lubrication system could lubricate certain portions of the engine 36, such as, for example but without limitation, the pivotal joints of the connecting rods with the crankshaft 56 and with the pistons, cam shafts, bearings journaling the crankshaft 56 within the crankcase and the walls of the cylinder bores.

Figure 6:
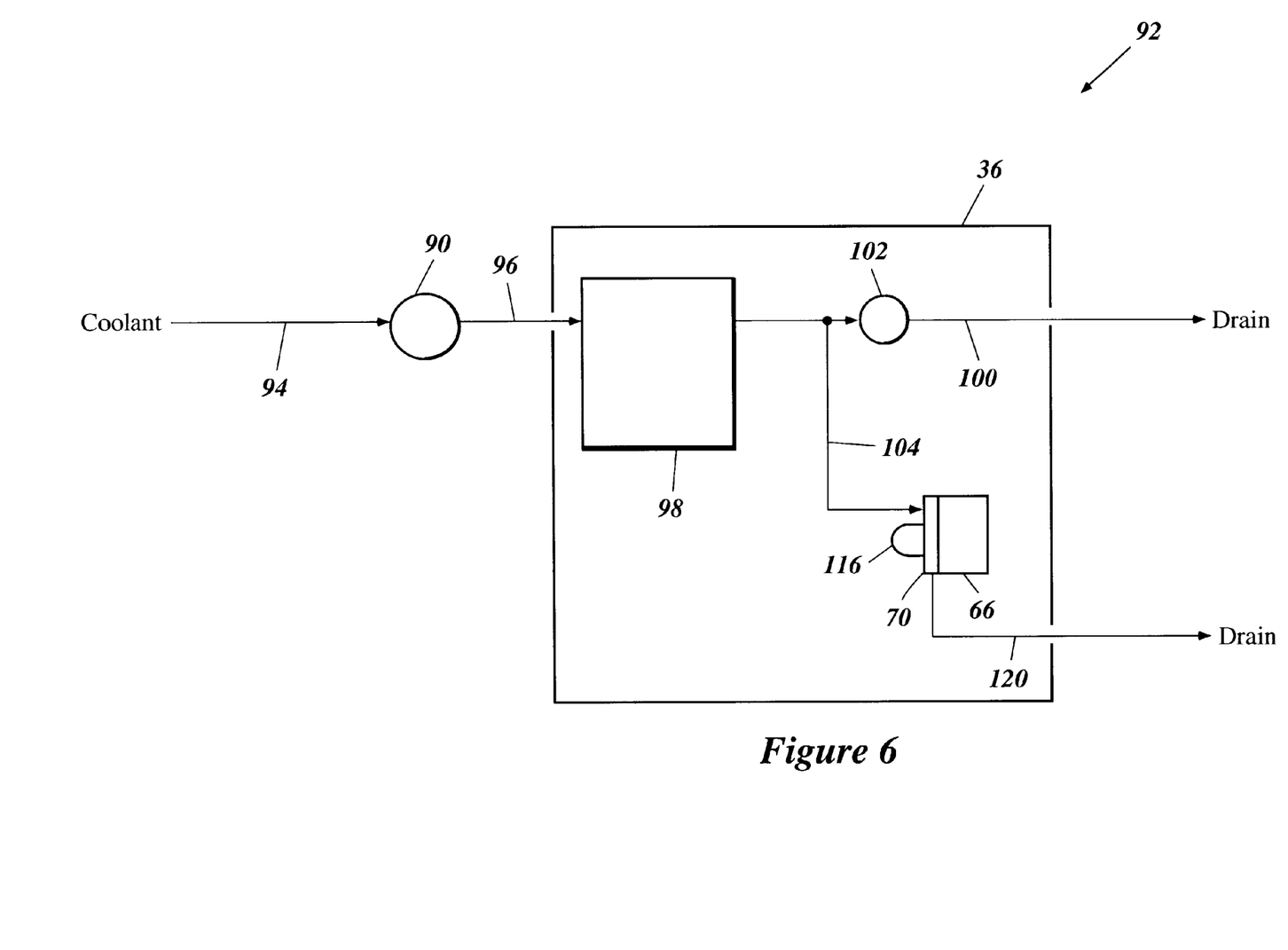
FIG. 6 is a schematic illustration of a cooling system that includes an arrangement for the carburetor having certain features and advantages according to the present invention.

Preferably, the driveshaft 80 also powers a coolant pump 90, which is part of a coolant system 92 that is illustrated schematically in FIG. 6. As shown in FIG. 6, the cooling system 92 preferably is arranged such that the coolant pump 90 draws coolant from the body of water in which the watercraft is operating. The coolant preferably is drawn through inlet passages 94 that are formed within the driveshaft housing 30. From the coolant pump 90, additional coolant passages 96 deliver the coolant to the engine 36 and various other components. More specifically, in the illustrated arrangement, the coolant provided is provided to a variety of cooling jackets 98, which are formed in the cylinder body 44 and cylinder head assembly 50 and serve to cool the cylinder bores.

The coolant preferably is returned to the body of water in which the watercraft 12 is operating through drainage passages 100. Alternatively, or in addition, a reservoir containing coolant can be provided from which the coolant is drawn and returned.

Preferably, a coolant temperature sensor 102 is provided for outputting a signal indicative of a temperature of coolant flowing through the cooling jacket 98. Such a sensor can be used by an engine control system as is well known in the art.

With reference to FIGS. 2–6, the arrangement for heating the carburetors 66 is illustrated therein. A coolant hose 104 is provided for transporting coolant from a portion of the coolant system 92 to the second mounting plate 70 (FIGS. 2 and 3). Preferably, one end of the coolant hose 104 is attached to a quick connect coupling fixture 106 located on the engine 36. The coupling fixture 106 preferably is in communication with to at least some of the cooling jackets 98 that are formed in the cylinder body 44 and/or cylinder head assembly 50. In modified arrangements, the coolant hose 104 can be attached to different portions of the coolant system. The illustrated arrangement is preferred, however, because as will be explained below it facilitates downhill flow of the coolant.

The other end of the coolant hose 104 is also attached to the mounting plate 70. Preferably, this end of the coolant hose 104 is attached to an upper end of the mounting plate 70. More preferably, the coolant hose 104 is attached to the mounting plate 70 at a point below the point at which the coolant hose 104 is attached to the engine 36. Such an arrangement is preferred because it allows the coolant to flow downhill from the engine 36 to the mounting plate 70. With reference to FIG. 4, a quick connect inlet coupling fixture 108 preferably is provided on the mounting plate 70 for connecting the coolant hose 104 to the mounting plate 70.

The mounting plate 70 includes a first coolant passage 108 that is connected to the inlet coupling fixture 106 and a second coolant passage 110. Preferably, the first and second coolant passages 108, 110 are arranged such that they lie substantially perpendicular to the flow direction of the air/fuel charge through the intake holes 74 formed in the mounting plate 70. More preferably, the coolant passages 108, 110 also are arranged such that they are not parallel to each other. Most preferably, the first and second inlet passages 108 also are located between the intake holes 74.

In the illustrated arrangement, the first coolant passage 108 is connected to the second coolant passage 110 by a combination of quick connect outlet and inlet coupling fixtures 112, 114 and a connection hose 116 (see FIG. 2). In a modified arrangement, the first and second coolant passages 108, 110 can be connected to each other by a passage formed within the mounting plate 70. Preferably, with reference to FIG. 4, the first coolant passage 108, the second coolant passage 110, and the connection hose 116 are arranged such that the coolant flows downhill through the mounting plate 70. The outlet of the second coolant passage 110 is preferably connected to a quick connect outlet coupling fixture 118, which, in turn, is connected to an outlet coolant hose 120 (see FIGS. 2 and 6). In the illustrated arrangement, the coolant preferably is returned to the body of water in which the watercraft 12 is operating through the outlet coolant hose 120. Of course, in some arrangements, the outlet coolant hose 120 can be arranged to deliver coolant to a reservoir from which the coolant is drawn and returned.

In the illustrated arrangement, each charger former 66 is associated with an individual cylinder. In a modified arrangement, a single charge former 66 can be configured to provide a fuel/air charge to a plurality of cylinders. In such an arrangement, the first and second coolant passages 108, 110 can be arranged around a single intake hole 74. In another modified arrangement, the first and coolant passages 108, 110 can be formed within the first mounting plate 68 and the coolant hoses 104, 116, 120 can be modified accordingly.

The arrangements described above have several advantages. For example, the arrangement provides coolant warmed by the engine 36 to the mounting plate 70. The warm coolant, in turn, warms the carburetor 66, which is attached to the mounting plate 70. Accordingly, the carburetors 66 are efficaciously heated in a manner that takes up less space than prior art arrangements. This arrangement also is less complicated and less expensive than the prior art arrangements.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An internal combustion engine comprising at least one combustion chamber formed by at least a first member and a second member that moves relative to the first member, the second member being coupled to an output shaft such that movement of the second member causes the output shaft to rotate, a cooling system configured to circulate coolant into thermal communication with at least a portion of the engine, an induction system for providing a fuel/air charge to the combustion chamber which includes a charge former configured to form the fuel/air charge and a mounting plate that is attached to the charge former the mounting plate comprising a first coolant passage that is in communication with the cooling system, said first coolant passage being substantially isolated from any airflow through said induction system.

2. The engine as set forth in claim 1, wherein the charge former is a carburetor.

3. The engine as set forth in claim 1, wherein the first coolant passage lies substantially perpendicular to a flow direction of the fuel/air charge through the mounting plate.

4. The engine as set forth in claim 1, wherein the engine includes a plurality of combustion chambers and the induction system includes a plurality of intake passages and a plurality of charge formers, wherein each of the plurality of combustion chambers is associated with one of the plurality of intake passages and one of the plurality of charge formers, the mounting plate being attached to each of the plurality of charge formers and including a plurality of intake holes corresponding to each of the plurality of charge formers, the first coolant passage lying between adjacent intake holes.

5. The engine as set forth in claim 1, wherein the mounting plate includes a second coolant passage that is connected to the first coolant passage.

6. The engine as set forth in claim 5, wherein the engine includes a plurality of combustion chambers and the induction system includes a plurality of intake passages and a plurality of charge formers, wherein each of the plurality of combustion chambers is associated with one of the plurality of intake passages and one of the plurality of charge formers, the mounting plate being attached to each of the plurality of charge formers and including a plurality of intake holes corresponding to each of the plurality of charge formers, the first coolant passage lying between a first set of adjacent intake holes and the second coolant passage lying between a second set of adjacent intake holes.

7. The engine as set forth in claim 5, wherein said first and passages are not parallel to each other.

8. The engine as set forth in claim 5, wherein the first coolant passage and the second coolant passage lie substantially perpendicular to the direction of the fuel/air charge through the mounting plate.

9. The engine as set forth in claim 1, wherein the mounting plate is positioned upstream of the charge former.

10. The engine as set forth in claim 1, wherein the mounting plate is positioned downstream of the charge former.

11. The engine as set forth in claim 1, wherein coolant flows downhill from the coolant system to the first coolant passage.

12. The engine as set forth in claim 11, wherein the mounting plate includes a second coolant passage that is connected to the first coolant passage, the first and second coolant passages being arranged such that coolant flows downhill from the first coolant passage to the second coolant passage.

13. The engine as set forth in claim 1, wherein the output shaft extends in a generally vertical direction.

14. The engine as set forth in claim 1, wherein the engine operates on a four-cycle principle.

15. The engine as set forth in claim 1, wherein the cooling system includes a cooling jacket formed within the first member and the mounting plate is in communication with the cooling jacket.

16. An internal combustion engine comprising at least one combustion chamber, formed by at least a first member and a second member that moves relative to the first member, the second member being coupled to an output shaft such that movement of the second member causes the output shaft to rotate, a cooling system configured to circulate coolant into thermal communication with at least a portion of the engine, an induction system for providing a fuel/air charge to the combustion chamber that includes a charge former configured to form the fuel/air charge and means for mounting the charge former comprising means for warming the charge former with coolant from the cooling system.

17. The engine as set forth in claim 16, wherein the output shaft extends in a generally vertical direction.

18. The engine as set forth in claim 16, wherein the engine operates on a four-cycle principle.

19. An internal combustion engine comprising a cylinder body, a cylinder head mounted to the cylinder body, a combustion chamber defined within said cylinder body, said cylinder body comprising a generally horizontally extending cylinder axis, a cooling passage extending through at least one of said cylinder body and said cylinder head, an induction system being in fluid communication with said combustion chamber, a charge former positioned along a portion of said induction system, said charge former being mounted to a mounting plate, said mounting plate comprising a first passage that is connected to said cooling passage with a hose.

20. The engine of claim 19, wherein said first passage is substantially enclosed in said mounting plate relative to any airflow through said induction system.

21. The engine of claim 19, wherein said hose is connected to said cooling passage with a quick connect coupling fixture.

22. The engine of claim 19, wherein said hose is connected to said mounting plate with, and communicates with said first passage through, a quick connect coupling fixture.

23. The engine of claim 19, wherein said hose connects to said first passage at a first vertical position and said hose connects to said cooling passage at a second vertical position that is vertically higher than said first vertical position.

24. The engine of claim 19, wherein said hose angles downward from a connecting point with said coolant passage to a connecting point with said first passage.

25. The engine of claim 19, wherein said mounting plate comprises an upper portion and a lower portion and wherein said hose connects to said mounting plate at said upper portion.

26. The engine of claim 19, wherein said mounting plate further comprises a second passage with said first passage being disposed completely vertically higher than said second passage.

27. The engine of claim 26, wherein said first passage is in fluid communication with said second passage.

28. The engine of claim 27 further comprising a coupling tube that connects said first passage and said second passage.

29. The engine of claim 26, wherein said mounting plate further comprises a first aperture though which air flowing through said induction system passes, said first aperture being interposed between said first passage and said second passage.

30. The engine of claim 29, wherein said first passage and said second passage each comprise an axis of flow and said axes of flow are substantially perpendicular to an axis of flow through said first aperture.

31. The engine of claim 30, wherein said axis of said first passage and said axis of said second passage are skewed relative to each other.

32. The engine of claim 31, wherein a single generally vertical plane intersects said first passage and said second passage.

33. The engine of claim 29, wherein said mounting plate comprises a second aperture and at least one of said first passage and said second passage extend through said mounting plate at a position between said first aperture and said second aperture.

34. An internal combustion engine comprising a cylinder body, a cylinder head mounted to the cylinder body, a combustion chamber defined within said cylinder body, a cooling passage extending through at least one of said cylinder body and said cylinder head, an induction system being in fluid communication with said combustion chamber, a charge former positioned along a portion of said induction system, said charge former being mounted to a mounting plate, said mounting plate comprising a first side and a second side, a bore extending through said mounting plate from said first side to said second side, said bore defining a first fluid passage, said first fluid passage being connected to said cooling passage with a hose, said mounting plate further comprising a hole that extends through said mounting plate and said hole defining a first airflow passage, said first airflow passage and said first fluid passage being configured to not intersect.

35. The engine of claim 34, wherein said first fluid passage and said first airflow passage are generally normal to each other.

36. The engine of claim 34 further comprising a second fluid passage, said first airflow passage being interposed between said first fluid passage and said second fluid passage.

37. The engine of claim 36, wherein a single generally vertical plane intersects said first fluid passage and said second fluid passage.

38. The engine of claim 34 further comprising a second airflow passage, said first fluid passage being interposed between said first airflow passage and said second airflow passage.

39. The engine of claim 34, wherein said cylinder body defines a cylinder bore and a piston reciprocates within said cylinder bore, said piston reciprocating along a generally horizontal axis.

40. The engine of claim 39, wherein said first fluid passage extends at an angle downward from an inlet to an outlet.

* * * * *

UNITED STATES PATENT AND TRADEMARK OFFICE
CERTIFICATE OF CORRECTION

PATENT NO.   : 6,474,317 B2                                                   Page 1 of 1
DATED        : November 5, 2002
INVENTOR(S)  : Okuzawa et al.

It is certified that error appears in the above-identified patent and that said Letters Patent is hereby corrected as shown below:

Column 7,
Lines 60 and 61, please delete "first and passages" and insert therefore -- first and second coolant passages --

Signed and Sealed this

Twenty-fifth Day of November, 2003

JAMES E. ROGAN
*Director of the United States Patent and Trademark Office*